US012211330B2

(12) United States Patent
Shen

(10) Patent No.: US 12,211,330 B2
(45) Date of Patent: Jan. 28, 2025

(54) CONTROL METHOD OF A COMBINATION LOCK

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 172 days.

(21) Appl. No.: 18/190,536

(22) Filed: Mar. 27, 2023

(65) Prior Publication Data

US 2024/0304048 A1 Sep. 12, 2024

(30) Foreign Application Priority Data

Mar. 7, 2023 (TW) ................................ 112108249

(51) Int. Cl.

| | |
|---|---|
| ***G07C 9/00*** | (2020.01) |
| ***E05B 37/02*** | (2006.01) |
| ***G07C 9/33*** | (2020.01) |
| ***G07C 9/37*** | (2020.01) |

(52) U.S. Cl.

CPC ........ *G07C 9/00817* (2013.01); *E05B 37/025* (2013.01); *G07C 9/00309* (2013.01); *G07C 9/00563* (2013.01); *G07C 9/33* (2020.01); *G07C 9/37* (2020.01); *G07C 2009/00793* (2013.01); *G07C 2009/00825* (2013.01); *G07C 2009/00841* (2013.01); *G07C 2209/63* (2013.01)

(58) Field of Classification Search

CPC ............ G07C 9/00817; G07C 9/00309; G07C 9/00563; G07C 9/33; G07C 9/37; G07C 2009/00793; G07C 2009/00825; G07C 2009/00841; G07C 2209/63; G07C 9/00571; E05B 37/025

USPC .......................................................... 340/5.2

See application file for complete search history.

(56) References Cited

U.S. PATENT DOCUMENTS

| | | | |
|---|---|---|---|
| 4,348,835 | A | 9/1982 | Jones et al. |
| 4,867,496 | A | 9/1989 | Thomas |
| 5,782,509 | A | 7/1998 | Uyeda |
| 6,177,771 | B1 | 1/2001 | Kinzer et al. |
| 6,454,324 | B1 | 9/2002 | Lewis et al. |
| 6,634,140 | B1 | 10/2003 | Sellman |
| 6,745,603 | B1 | 6/2004 | Shaw |
| 6,786,006 | B2 | 9/2004 | Kowalczyk et al. |
| 6,891,479 | B1 | 5/2005 | Eccleston |
| 7,051,403 | B2 | 5/2006 | Homberg |

(Continued)

FOREIGN PATENT DOCUMENTS

| | | | |
|---|---|---|---|
| AU | 2014339759 | B2 | 5/2018 |
| EP | 1788169 | A1 | 5/2007 |

(Continued)

*Primary Examiner* — Omar Casillashernandez

(74) *Attorney, Agent, or Firm* — Ying-Ting Chen; Law Office of Michael Chen

(57) ABSTRACT

A control method of a combination lock includes executing a lock management program to obtain the management authority of the combination lock. When any unlocking password of the combination lock is assigned to a third person, the lock management program can tie each authorized unlocking password with its associated information to create a password list. When the unlocking authority of the combination lock is to be changed, the lock management program can display each authorized unlocking password together with its associated information, permitting deletion or change of the selected unlocking password and/or its associated information.

17 Claims, 6 Drawing Sheets

(56) References Cited

U.S. PATENT DOCUMENTS

| | | | | |
|---|---|---|---|---|
| 7,061,197 | B1 | 6/2006 | Mullet et al. | |
| 7,068,179 | B2 | 6/2006 | Snell et al. | |
| 7,143,547 | B2 | 12/2006 | Liles, Jr. | |
| 7,234,201 | B2 | 6/2007 | Brown et al. | |
| 7,282,883 | B2 | 10/2007 | Mullet et al. | |
| 7,296,380 | B2 | 11/2007 | Backman | |
| 7,316,096 | B2 | 1/2008 | Houser et al. | |
| 7,418,800 | B1 | 9/2008 | Sellman | |
| 7,484,333 | B2 | 2/2009 | Houser et al. | |
| 7,555,867 | B2 | 7/2009 | Liles, Jr. | |
| 7,717,155 | B2 | 5/2010 | Mullet | |
| 7,774,984 | B2 | 8/2010 | Hsu | |
| 7,966,771 | B2 | 6/2011 | Bienek | |
| 8,109,038 | B2 | 2/2012 | Houser et al. | |
| 8,169,169 | B2 | 5/2012 | Hass et al. | |
| 8,248,005 | B2 | 8/2012 | Romer | |
| 8,359,790 | B2 | 1/2013 | Shin | |
| 8,382,008 | B1 | 2/2013 | Ricciardi et al. | |
| 8,390,219 | B2 | 3/2013 | Houser | |
| 8,393,054 | B2 | 3/2013 | Bienek | |
| 8,407,937 | B2 | 4/2013 | Houser | |
| 8,415,902 | B2 | 4/2013 | Burris et al. | |
| 8,434,268 | B2 | 5/2013 | Nixon | |
| 8,499,495 | B2 | 8/2013 | Houser et al. | |
| 8,547,046 | B2 | 10/2013 | Burris et al. | |
| 8,601,744 | B2 | 12/2013 | Wildforster et al. | |
| 8,633,798 | B2 * | 1/2014 | Lin ......................... | G06F 21/32 340/5.2 |
| 8,695,277 | B2 | 4/2014 | Romer et al. | |
| 8,826,598 | B2 | 9/2014 | Ranaudo et al. | |
| 8,875,344 | B2 | 11/2014 | Salutzki et al. | |
| 8,904,710 | B2 | 12/2014 | Romer et al. | |
| 8,963,683 | B2 | 2/2015 | Romer | |
| 9,003,630 | B2 | 4/2015 | Hufen | |
| 9,045,927 | B1 | 6/2015 | Hoffberg | |
| 9,097,051 | B2 | 8/2015 | Hellwig | |
| 9,115,526 | B2 | 8/2015 | Houser et al. | |
| 9,121,217 | B1 | 9/2015 | Hoffberg | |
| 9,163,446 | B2 | 10/2015 | Houser et al. | |
| 9,181,744 | B2 | 11/2015 | Salutzki et al. | |
| 9,187,942 | B2 | 11/2015 | Wildforster | |
| 9,297,194 | B2 | 3/2016 | Bienek et al. | |
| 9,506,284 | B2 | 11/2016 | Braverman et al. | |
| 9,514,583 | B2 | 12/2016 | Zasowski et al. | |
| 9,631,412 | B2 | 4/2017 | Hellwig et al. | |
| 9,683,378 | B2 | 6/2017 | Houser et al. | |
| 9,695,620 | B2 | 7/2017 | Zasowski et al. | |
| 9,869,117 | B2 | 1/2018 | Houser et al. | |
| 9,995,076 | B1 | 6/2018 | Hoffberg | |
| 10,006,236 | B2 | 6/2018 | Hellwig et al. | |
| 10,024,094 | B2 | 7/2018 | Bell et al. | |
| 10,030,425 | B2 | 7/2018 | Zasowski et al. | |
| 10,030,426 | B2 | 7/2018 | Langenberg | |
| 10,077,591 | B2 | 9/2018 | Hass | |
| 10,180,023 | B2 | 1/2019 | Zasowski et al. | |
| 10,208,520 | B2 | 2/2019 | Long et al. | |
| 10,236,801 | B2 | 3/2019 | Dye et al. | |
| 10,253,540 | B2 | 4/2019 | Bell et al. | |
| 10,273,736 | B2 | 4/2019 | Hucker | |
| 10,280,670 | B2 | 5/2019 | Roberts | |
| 10,280,678 | B1 | 5/2019 | Rendon, Jr. et al. | |
| 10,304,272 | B2 | 5/2019 | Kvinge et al. | |
| 10,316,568 | B2 | 6/2019 | Langenberg et al. | |
| 10,344,502 | B2 | 7/2019 | McKibben et al. | |
| 10,415,301 | B2 | 9/2019 | Kuan | |
| 10,458,151 | B1 | 10/2019 | Shen | |
| 10,472,873 | B2 | 11/2019 | Ladha et al. | |
| 10,559,151 | B2 | 2/2020 | Kvinge et al. | |
| 10,648,208 | B2 | 5/2020 | Eickhoff | |
| 10,704,310 | B1 | 7/2020 | Barbon et al. | |
| 10,704,313 | B2 | 7/2020 | Houser et al. | |
| 10,724,288 | B2 | 7/2020 | Baumgarte | |
| 10,844,644 | B2 | 11/2020 | Langenberg et al. | |
| 10,968,677 | B2 | 4/2021 | Hass | |
| 11,124,997 | B2 | 9/2021 | Eickhoff | |
| 11,250,655 | B2 | 2/2022 | Shen | |
| 11,405,189 | B1 * | 8/2022 | Bennison ............ | H04L 63/0807 |
| 11,542,727 | B2 | 1/2023 | Hsu | |
| 11,544,979 | B1 | 1/2023 | Shen | |
| 2003/0127869 | A1 | 7/2003 | Herron et al. | |
| 2005/0154612 | A1 | 7/2005 | Smith et al. | |
| 2006/0244271 | A1 | 11/2006 | Hass | |
| 2007/0256362 | A1 | 11/2007 | Hansen | |
| 2010/0107495 | A1 | 5/2010 | Bourgeois et al. | |
| 2010/0315229 | A1 | 12/2010 | Shin | |
| 2013/0009785 | A1 | 1/2013 | Finn et al. | |
| 2013/0216438 | A1 | 8/2013 | Hill et al. | |
| 2014/0255252 | A1 | 9/2014 | Stratman et al. | |
| 2014/0282934 | A1 | 9/2014 | Miasnik et al. | |
| 2015/0067804 | A1 * | 3/2015 | Maxwell ................. | H04L 51/48 726/7 |
| 2016/0220716 | A1 | 8/2016 | Childress et al. | |
| 2016/0348415 | A1 | 12/2016 | Baumgarte | |
| 2017/0275912 | A1 | 9/2017 | Murphy | |
| 2017/0275921 | A1 | 9/2017 | Murphy et al. | |
| 2017/0328100 | A1 | 11/2017 | Eickhoff | |
| 2018/0334841 | A1 | 11/2018 | Langenberg et al. | |
| 2019/0043296 | A1 | 2/2019 | Baumgarte et al. | |
| 2019/0145138 | A1 | 5/2019 | Eickhoff | |
| 2019/0153764 | A1 | 5/2019 | Baumgarte | |
| 2019/0203503 | A1 | 7/2019 | Chang | |
| 2019/0264486 | A1 | 8/2019 | Toloday et al. | |
| 2019/0319557 | A1 | 10/2019 | Dye et al. | |
| 2019/0338576 | A1 | 11/2019 | Wang | |
| 2019/0345738 | A1 | 11/2019 | McKibben et al. | |
| 2019/0376316 | A1 | 12/2019 | Hsu | |
| 2019/0376317 | A1 | 12/2019 | Hsu | |
| 2019/0383080 | A1 | 12/2019 | Barbon et al. | |
| 2020/0037142 | A1 | 1/2020 | Lofton | |
| 2020/0190885 | A1 | 6/2020 | Coleman | |
| 2020/0256108 | A1 | 8/2020 | Shetty et al. | |
| 2020/0293647 | A1 * | 9/2020 | Yang .................... | G06Q 20/382 |
| 2020/0327758 | A1 | 10/2020 | Ma et al. | |
| 2020/0372743 | A1 | 11/2020 | Miller et al. | |
| 2021/0011443 | A1 | 1/2021 | McNamara et al. | |
| 2021/0012598 | A1 | 1/2021 | Giebat et al. | |
| 2021/0023248 | A1 | 1/2021 | Townsend et al. | |
| 2021/0056791 | A1 | 2/2021 | Shen | |
| 2021/0123287 | A1 | 4/2021 | Miller et al. | |
| 2021/0166241 | A1 * | 6/2021 | Woo ..................... | G06V 40/172 |
| 2021/0252179 | A1 | 8/2021 | Grinstead et al. | |
| 2021/0308311 | A1 | 10/2021 | Stewart et al. | |
| 2022/0083642 | A1 * | 3/2022 | Wu ......................... | G06F 21/45 |
| 2022/0307316 | A1 | 9/2022 | Soderqvist | |

FOREIGN PATENT DOCUMENTS

| | | | |
|---|---|---|---|
| EP | 3550528 | A1 | 9/2019 |
| EP | 3805490 | A1 | 4/2021 |
| GB | 2572027 | A | 9/2019 |
| KR | 20210019168 | A | 2/2021 |
| KR | 20210033154 | A | 3/2021 |
| WO | 8800633 | A1 | 1/1988 |
| WO | 2021007588 | A1 | 1/2021 |
| WO | 2021050616 | A1 | 3/2021 |
| WO | 2021214134 | A1 | 10/2021 |

* cited by examiner

CONTROL METHOD OF A COMBINATION LOCK

BACKGROUND OF THE INVENTION

The present invention relates to a control method of a combination lock and, more particularly, to a control method for controlling addition, deletion or change of the authority of a primary manager, a secondary manager, a primary user, a secondary user, a one-time user of a combination lock.

A type of currently available combination door lock generally includes a keypad disposed on an outer side thereof. The keypad may be a physical device or a touch control device and may include numeric keys and functional keys. Such a combination door lock can be unlocked only when a correct password is inputted through use of the keypad.

When the combination door lock is used in a place where persons access frequently, such as an open area, a company, a school, etc., different passwords are often set for different users.

For example, each of three persons of the same company has a personal password (namely, three passwords are involved) capable of unlocking the combination lock. When one of the three persons resigns, the company deletes the password assigned to the resigned person, such that the deleted password assigned to the resigned person cannot be used for unlocking purposes, whereas the passwords assigned to the other two persons are still valid for unlocking purposes.

The combination lock is generally not equipped with a screen and, thus, requires a paper password list with all passwords for a plurality of users. Thus, a manager can check the password assigned to each user with the unlocking authority of the combination lock. However, management of the combination lock is not convenient, and the password list is apt to be copied, which is not safe. Furthermore, setting of users with different authorities of the combination lock is relatively complicated, and the users often have to follow the operational manual while proceeding with the setting.

BRIEF SUMMARY OF THE INVENTION

To solve the above problem, the present invention provides a control method of a combination lock, with the control method comprising:

- executing a lock management program installed in a primary manager's mobile device;
- using a keypad of a combination lock to input a password and selecting an authorization procedure to be executed by the combination lock, wherein when the inputted password does not match an original password stored in the combination lock, the combination lock does not enter the authorization procedure, and wherein when the inputted password matches the original password, the combination lock enters the authorization procedure and is connected with the primary manager's mobile device;
- using the primary manager's mobile device to input a real-time password through the an interface of the lock management program while the primary manager's mobile device is in connection with the combination lock and the combination lock executes the authorization procedure, wherein when the real-time password does not match the original password, the lock management program request input of a new real-time password, and wherein when the real-time password matches the original password, the lock management program requests input of an identity information of a biological feature of the primary manager; and
- identifying the identity information and operating the lock management program to enter a main setting mode providing option of resetting the original password, wherein when resetting the original password is not selected, the original password is still used as the primary manager's password, and the primary manager's mobile device obtains primary management authority of the combination lock, and wherein when resetting the original password is selected, a new password is inputted and becomes the primary manager's password, wherein the identity information of the primary manager is tied with the primary manager's password, and the primary manager's mobile device obtains the primary management authority of the combination lock.

As can be appreciated from the described technical features of the present invention, the primary manager's mobile device of the primary manager can easily proceed with operations of obtaining the management authority of the combination lock and changing the primary manager's password.

In an example, the biological feature is one of a fingerprint feature, a facial feature, an iris feature, and a finger vein feature. The original password is a password preset by a manufacturer of the combination lock.

When the lock management program is executed, the identity information must be inputted to permit the lock management program to identity whether the holder of the primary manager's mobile device or the secondary manager's mobile device has the management authority. The lock management program will automatically enter the main setting mode or the secondary setting mode based on the identity of the holder which is identified as the primary manager or the secondary manager. Thus, the lock management program provides both safety and convenience.

In an example, the control method further comprises using the keypad of the combination lock to input an unlocking password and selecting an unlocking procedure. When the unlocking password does not match the primary manager's password, the combination lock remains locked. The combination lock is unlocked when the unlocking password matches the primary manager's password.

In an example, with the primary manager's mobile device which has obtained the management authority of the combination lock is within a communication range of the combination lock and the primary manager's mobile device executes the lock management program, the primary manager's mobile device requests input of an identity information. When the identity information is incorrect, the lock management program does not enter a main setting mode. When the identity information is correct, the management program enters the main setting mode. When a primary user setting procedure of the main setting mode is selected, the lock management program requests input of a primary user's information including a primary user's serial number, and a primary user's password associated with the primary user's information is created and listed on a password list. The primary user's password is transmitted to the combination lock to update the combination lock information, permitting unlocking of the combination lock by the primary user's password.

The password list can show the information and associated password of each authorized primary user, each authorized one-time user, each authorized secondary manager, and each authorized secondary user to assist the primary manager and the secondary manager in effectively managing the authorization of the combination lock.

In an example, with the lock management program entering the main setting mode, when a change and deletion procedure of the main setting mode is selected, the lock management program displays all contents on the password list. The control method further comprises:

selecting a primary user whose password is to be changed from the password list, changing the password of the selected primary user by inputting a new primary user's password associated with the primary user, and updating the password list and the combination lock information to include the change of the primary user's password, or selecting a primary user whose information is to be deleted from the password list, deleting the information and the password of the selected primary user, and updating the password list and the combination lock information to include the deletion of the primary user's password and the primary user's information.

In an example, with an unlocking password inputted via the keypad of the combination lock and an unlocking procedure is selected, when the unlocking password matches none of the primary manager's password and the primary user's password, the combination lock remains locked. When the unlocking password matches one of the primary manager's password and the primary user's password, the combination lock is unlocked.

In an example, when the identity information is correct, the primary manager's mobile device transmits the primary manager's password to the combination lock connected with the primary manager's mobile device. The combination lock informs the primary manager's mobile device after the combination lock confirms the primary manager's password is correct, such that the primary manager's mobile device confirms the identity information and enters the main setting mode.

When the lock management program is executed, the identity information must be inputted to permit the lock management program to identity whether the holder of the primary manager's mobile device or the secondary manager's mobile device has the management authority. The lock management program will automatically enter the main setting mode or the secondary setting mode based on the identity of the holder which is identified as the primary manager or the secondary manager. Thus, the lock management program provides both safety and convenience.

In an example, with the primary manager's mobile device which has obtained the management authority of the combination lock is within a communication range of the combination lock and the primary manager's mobile device executes the lock management program, the primary manager's mobile device requests input of an identity information. When the identity information is incorrect, the lock management program does not enter a main setting mode. When the identity information is correct, the management program enters the main setting mode. When a secondary manager setting procedure of the main setting mode is selected, the lock management program requests input of a secondary manager's information including a secondary manager's serial number, and a secondary manager's password associated with the secondary manager's information is created and listed on a password list. The secondary manager's password is transmitted to the combination lock to update the combination lock information, permitting unlocking of the combination lock by the secondary manager's password. The secondary manager's password and the secondary manager's information are transmitted to a secondary manager's mobile device. A lock management program of the secondary manager's mobile device requests input of an identity information including a biological feature of the secondary manager. After input of the identity information of the secondary manager, the identity information of the secondary manager, the secondary manager's information, and the secondary manager's password are tied together. The secondary manager's mobile device obtains a secondary management authority of the combination lock.

In an example, when the identity information is correct, the secondary manager's mobile device transmits the secondary manager's password to the combination lock connected with the secondary manager's mobile device. The combination lock informs the secondary manager's mobile device after the combination lock confirms the secondary manager's password is correct, such that the secondary manager's mobile device confirms the identity information and enters a secondary setting mode.

In an example, with the secondary manager's mobile device which has obtained the management authority of the combination lock is within a communication range of the combination lock and the secondary manager's mobile device executes the lock management program, the secondary manager's mobile device requests input of an identity information. When the identity information is incorrect, the lock management program does not enter a secondary setting mode. When the identity information is correct, the management program enters the secondary setting mode. When the secondary user setting procedure of the main setting mode is entered, the lock management program requests input of a secondary user's information including a secondary user's serial number, and a secondary user's password associated with the secondary user's information is created, and the password list is updated. The secondary user's password is transmitted to the combination lock to update the combination lock information, permitting unlocking of the combination lock by the secondary user's password.

In an example, with the lock management program entering the secondary setting mode, when a change and deletion procedure of the secondary setting mode is selected, the lock management program displays contents related to each secondary user authorized by the secondary manager on the password list. The control method further comprises:

selecting a secondary user whose password is to be changed from the password list, changing the password of the selected secondary user by inputting a new secondary user's password associated with the secondary user, and updating the password list and the combination lock information to include the change of the secondary user's password, or selecting a secondary user whose information is to be deleted from the password list, deleting the information and the password of the selected secondary user (S139), and updating the password list and the combination lock information to include the deletion of the secondary user's password and the secondary user's information.

In an example, with an unlocking password inputted via the keypad of the combination lock and an unlocking procedure is selected, when the unlocking password matches none of the primary manager's password and the secondary manager's password, the combination lock remains locked. When the unlocking password matches one of the primary manager's password and the secondary manager's password, the combination lock is unlocked.

In an example, with an unlocking password inputted via the keypad of the combination lock and an unlocking procedure is selected, when the unlocking password matches none of the primary manager's password, the secondary manager's password, and the secondary user's password, the combination lock remains locked. When the unlocking password matches one of the primary manager's password, the secondary manager's password, and the secondary user's password, the combination lock is unlocked.

In an example, with the primary manager's mobile device which has obtained the management authority of the combination lock is within a communication range of the combination lock and the primary manager's mobile device executes the lock management program, the primary manager's mobile device requests input of an identity information. When the identity information is incorrect, the lock management program does not enter a main setting mode. When the identity information is correct, the management program enters the main setting mod. When a primary manager's password change procedure of the main setting mode is selected, the lock management program requests input of a current primary manager's password. When the inputted password does not match the current primary manager's password, the current primary manager's password is not changed. When the inputted password matches the current primary manager's password, a new primary manager's password is inputted to change the primary manager's password, and the new primary manager's password is transmitted to the combination lock to update the combination lock information, permitting unlocking of the combination lock by the new primary manager's password.

In an example, with the primary manager's mobile device which has obtained the management authority of the combination lock is within a communication range of the combination lock and the primary manager's mobile device executes the lock management program, the primary manager's mobile device requests input of an identity information. When the identity information is incorrect, the lock management program does not enter a main setting mode. When the identity information is correct, the management program enters the main setting mode. When a one-time user setting procedure of the main setting mode is selected, the lock management program requests input of a one-time user's information including a one-time user's serial number, and a one-time user's password associated with the one-time user's information is created and listed on a password list. The one-time user's password is transmitted to the combination lock to update the combination lock information, permitting one-time unlocking operation of the combination lock by the one-time user's password.

In an example, with an unlocking password inputted via the keypad of the combination lock and an unlocking procedure is selected, when the unlocking password matches none of the primary manager's password and the one-time user's password, the combination lock remains locked. When the unlocking password matches one of the primary manager's password and the one-time user's password, the combination lock is unlocked. The combination lock updates the combination lock information after the combination lock has been unlocked, such that the one-time password is incapable of unlocking the combination lock.

In an example, after the primary manager's mobile device has set the primary manager's password, the primary manager's mobile device acquires a hardware identification information of the combination lock. Every time the primary manager's mobile device is connected with the combination lock, the primary manager's mobile device uses the hardware identification information to identify whether the primary manager's mobile device has the management authority of the combination lock connected thereto.

The present invention will become clearer in light of the following detailed description of illustrative embodiments of this invention described in connection with the drawings.

DETAILED DESCRIPTION OF THE INVENTION

The present invention relates to a control method of a combination lock which can be installed on a door for access control. A keypad is disposed on an outer side of the combination lock and includes, but not limited to, a plurality of physical or virtual numeric keys and a plurality of physical or virtual functional keys. The combination lock may further include wireless communication technique including but not limited to Bluetooth, Wi-Fi, etc.

Figure 1:
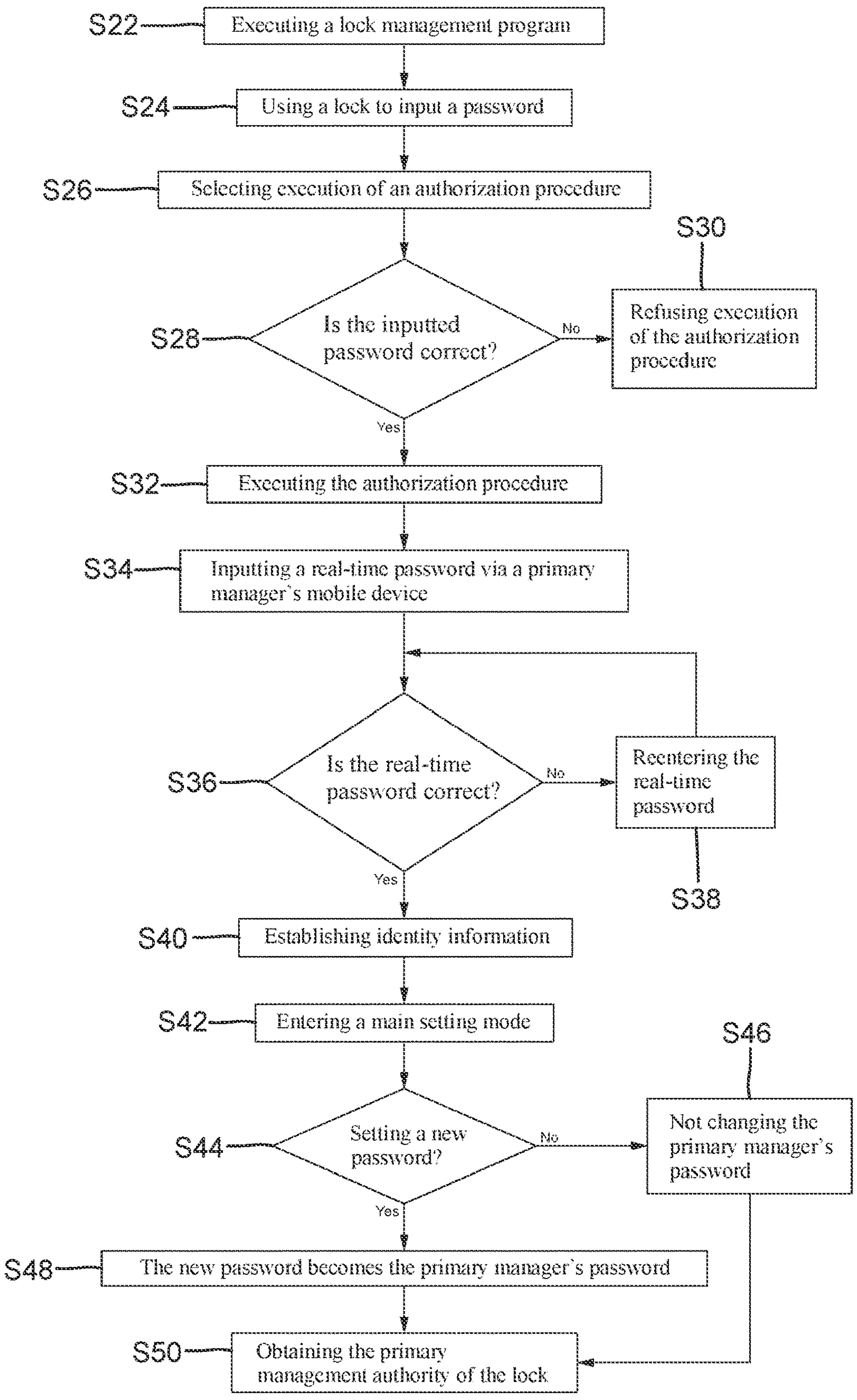
FIG. 1 is a flowchart illustrating obtaining a primary management authority of a lock by a primary manager's mobile device according to the present invention.

With reference to FIG. 1, when the combination lock is used for the first time, a primary manager installs a lock management program on a primary manager's mobile device, and the lock management program is executed (step S22). The lock management program can cooperate with applications (APP) associated with the combination lock. The primary manager's mobile device includes a screen which can display an operation interface of the lock management program. The primary manager's mobile device may be, but not limited to, a smart mobile phone available on the market.

After installation of the lock management program on the primary manager's mobile device, the primary manager's mobile device is ready for connection with the combination lock. A password can be entered through use of the keypad of the combination lock (step S24). Then, the combination lock can proceed with an authorization procedure via selection (step S26). The term "password" used herein refers to a password generally used in the art or in the form of a PIN code or the like.

In a non-restrictive embodiment, the keypad may comprise twelve (12) keys including 10 numeric keys (respectively corresponding to figures 0-9), a setting key, such as an asterisk (*) key, and an input key, such as a pound (#) key. The twelve keys may be physical or virtual, such as touch buttons on a touch screen. The password can be inputted by pressing the numeric keys, and the setting key can be pressed after input of the password. Thus, the combination lock can identify whether to proceed with the authorization procedure based on the identification result of the inputted password.

After inputting a password through the keypad and pressing the setting key, the combination lock identifies whether the inputted password is correct at step S28. When it is determined that the inputted password does not match an original password, the combination lock does not enter the authorization procedure and does not connect with the primary manager's mobile device (step S30). On the other hand, when it is determined that the inputted password matches the original password, the combination lock enters the authorization procedure and is connected with the primary manager's mobile device (step S32).

Specifically, a manufacturer of combination locks will set an original password for each combination lock. All combination locks produced by the manufacturer have the same original password. As long as the original password is not changed, the original password can be used to execute the authorization procedure and the unlocking procedure of each combination lock. Therefore, in the first use of the combination lock to execute the authorization procedure, the combination lock compares the inputted password with the original password to determine whether the combination lock enters the authorization procedure or not.

For example, in a case that the original password is 123456 and the password entered via the keypad is 133750 to request execution of the authorization procedure, execution of the authorization procedure will be denied due to non-matching of the inputted password and the original password. In another case that the password entered via the keypad is 123456 to request execution of the authorization procedure, the authorization procedure will be executed due to matching of the inputted password and the original password. After entering the authorization procedure, the combination lock establishes connection with the primary manager's mobile device via the wireless communication technique, such as Bluetooth.

When the primary manager's mobile device is connected with the combination lock, the primary manager's mobile device can be used to input a real-time password via an interface of the lock management program (step S34).

Specifically, after the primary manager's mobile device is connected with the combination lock, since the primary manager's mobile device has not yet obtained the primary management authority of the combination lock, the interface of the lock management program will display an image requesting input of a real-time password. In a non-restrictive example, the image includes a virtual keypad and a message indicating the request of input of a real-time password. A holder of the primary manager's mobile device can input the real-time password via the virtual keypad which should be identical to the original password.

The real-time password inputted via the interface of the lock management program is compared with the original password to identify whether the real-time password is correct (step S36). When the real-time password is not the same as the original password, the lock management program will request input of a real-time password again (step S38), rather than executing the next step. The procedure continues until the real-time password is correct.

When the real-time password is the same as the original password, the lock management program will request input of an identity information including a biological feature of the primary manager (step S40). The biological feature may be, but not limited to, a fingerprint feature, a facial feature, an iris feature, or a finger vein feature. For example, the primary manager's mobile device may include a fingerprint pick-up device. Thus, when the lock management program requests input of the biological feature, the holder of the primary manager's mobile device can use the fingerprint pick-up device to pick up the fingerprint to serve as the identity information.

After establishment of the identity information, the lock management program enters a main setting mode (step S42) to permit reset of the original password (step S44). When it is decided not to reset the original password, the original password becomes the primary manager's password, and the primary manager's mobile device obtains the primary management authority (step S46).

When a new original password is set and replaces the original password, the new password becomes the primary manager's password (step S48), and the primary manager's mobile device obtains the primary management authority of the combination lock (step S50).

Specifically, since the operation of setting the new password as the primary manager's password is executed through the lock management program, after setting the new password, the primary manager's mobile device sends the new password to the combination lock via wireless communication technique. After receiving the new password, the combination lock updates its lock information, such that the new password is correctly set as the primary manager's password, and the primary manager's mobile device obtains the management authority of the combination lock. Then, the combination lock exits the authorization procedure, and the lock management program of the primary manager's mobile device exits the main setting mode.

It is worth mentioning that the original password is pre-set by the manufacturer of the combination locks, and the original passwords of all combination locks are identical. Therefore, the lock management program provides a function of changing the original password to permit the user to set a new password as the primary manager's password, thereby enhancing the anti-theft effect. Nevertheless, use of the original password as the primary manager's password is also permitted.

In an embodiment, after setting the primary manager's password, the primary manager's mobile device acquires a hardware identification information of the combination lock. Every time the primary manager's mobile device is connected with the combination lock, the primary manager's mobile device uses the hardware identification information to identify whether the primary manager's mobile device has the management authority of the combination lock connected thereto.

After the primary manager's mobile device obtains the management authority of the combination lock, the primary manager's mobile device can proceed with operation of other authorizations or changing settings while the primary manager's mobile device is in connection with the combination lock via the lock management program.

Figure 5:
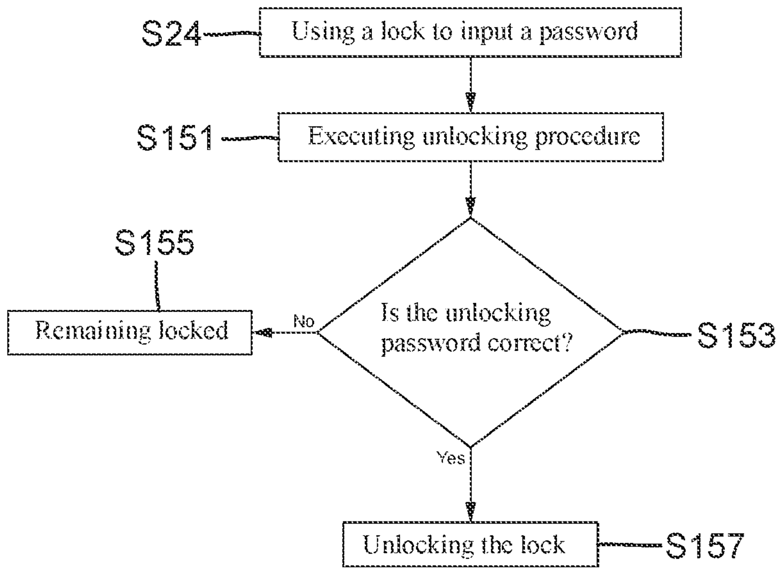
FIG. 5 is a flowchart illustrating input of an unlocking password for unlocking the lock.

The primary manager's password can be used to directly unlock the combination lock. With reference to FIG. 5, when an unlocking password is inputted via the keypad (step S24) and selects the unlocking procedure (step S151), the unlocking password is compared with the primary manager's password to identify whether the unlocking password is correct (step S153). When the unlocking password is not the same as the primary manager's password, the combination lock remains locked (step S155). When the unlocking password is the same as the primary manager's password, the combination lock is unlocked (step S157).

For example, in a case that the primary manager's password is 225676, when a person inputs 225676 via the keypad of the combination lock and presses the Enter key, the combination lock executes the unlocking procedure. The password inputted via the keypad is compared with the primary manager's password registered in the lock information. When the inputted password matches the primary manager's password, the combination lock is directly unlocked. In a case that the password inputted via the keypad is 235676 (which is not the correct password) and then presses the Enter key, the combination lock executes the unlocking procedure to compare the inputted password with the primary manager's password and determines that the inputted password is incorrect. Thus, the combination lock remains locked.

Figure 2A:
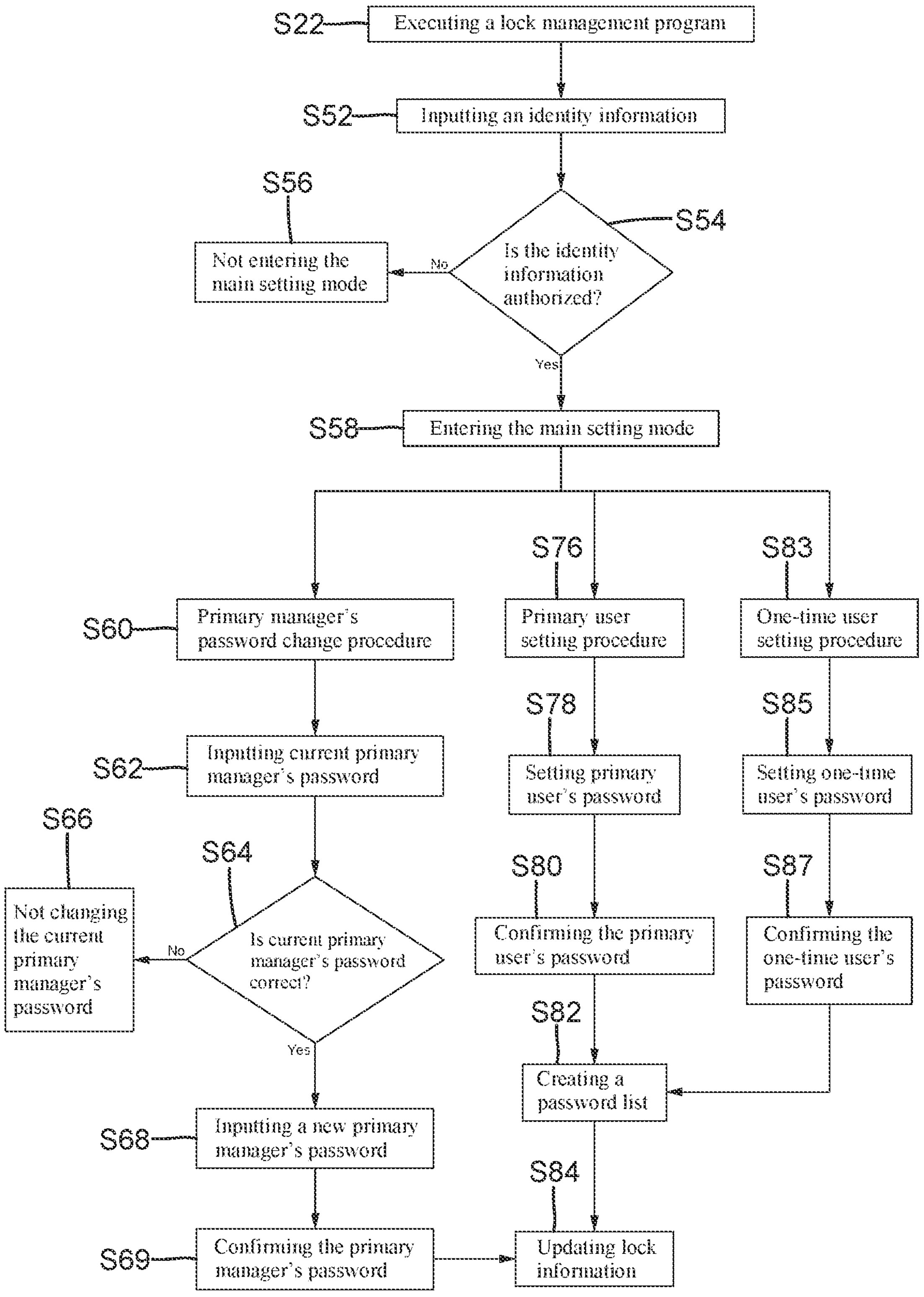
FIG. 2A is a flowchart illustrating entrance of the primary manager's mobile device into a main setting module after obtaining the primary management authority.

The holder of the primary manager's mobile device can change the primary manager's password after the primary manager's mobile device has obtained the management authority of the combination lock. With reference to FIG. 2A, while the primary manager's mobile device is within a communication range of the combination lock, when the lock management program is executed (step S22), the lock management program requests input of the identity information (step S52) which is to be identified at step S54. When it is determined that the identity information is incorrect, the lock management program does not enter the main setting mode (step S56). On the other hand, when it is determined that the identity information is correct, the lock management program enters the main setting mode (step S58) and establishes connection with the combination lock.

The main setting mode permits selection of a primary manager's password change procedure (step S60), a primary user setting procedure (step S76), and a one-time user's password setting procedure (step S83). In a case that the holder of the primary manager's mobile device selects the primary manager's password change procedure (step S60), the lock management program requests input of the current primary manager's password (step S62). The inputted password is compared with the current primary manager's password at step S64 to identify whether the inputted password is correct. When it is determined that the inputted password is incorrect, the current primary manager's password is not changed (step S66). On the other hand, when it is determined that the inputted password is correct, the lock management program will request input of a new primary manager's password (step S68). The lock management program will requests input of the new primary manager's password again for confirmation purposes. The twice input of the new primary manager's password will repeat until it is confirmed that the new primary manager's password inputted for the second time is the same as the new primary manager's password inputted for the first time (step S69). Thus, the primary manager's password will be updated after confirmation. The new primary manager's password will be transmitted to the combination lock to update the lock information (step S84). Therefore, the new primary manager's password can be used to unlock the combination lock.

For example, in a case that the new primary manager's password is 789632, when the holder of the primary manager's mobile device inputs 789632 via the keypad of the combination lock and presses the Enter key, the combination lock executes the unlocking procedure. The password inputted via the keypad is compared with the primary manager's password registered in the lock information. When the inputted password matches the primary manager's password, the combination lock is directly unlocked. In a case that the password inputted via the keypad is 225676 (such as the old primary manager's password) and then presses the Enter key, the combination lock executes the unlocking procedure to compare the inputted password with the primary manager's password registered in the lock information and determines that the inputted password is incorrect. Thus, the combination lock remains locked.

The primary manager's mobile device that has obtained the management authority of the combination lock can set other users. With reference to FIG. 2A, while the primary manager's mobile device is within the communication range of the combination lock, the primary manager's mobile device requests input of the identity information (step S52)

For example, the primary manager's mobile device is connected with the combination lock via Bluetooth. When it is desired to use the primary manager's mobile device to acquire the management authority of the combination lock, the primary manager's mobile device must be within the communication range of the combination lock. When the primary manager's mobile device is beyond the communication range of the combination lock, the primary manager's mobile device cannot proceed with any operation or setting on the combination lock even if the primary manager's mobile device executes the lock management program.

The inputted identity information is identified at step S54. When it is determined that the identity information is incorrect, the lock management program does not enter the main setting mode (step S56). On the other hand, when it is determined that the identity information is correct, the lock management program enters the main setting mode (step S58) and establishes connection with the combination lock.

In an embodiment, the identification of the primary manager is tied with the primary manager's password. When it is determined that the identity information is correct, the primary manager's mobile device automatically transmits the primary manager's password to the combination lock connected therewith. In this case, the primary manager's mobile device confirms the identity information is correct and enters the main setting mode.

For example, in a case that the identity information is the fingerprint feature of the primary manager and the primary manager's password is 225676, when the fingerprint feature inputted via the primary manager's mobile device is incorrect, the lock management program of the primary manager's mobile device will not enter the main setting mode. On the other hand, when the fingerprint feature inputted via the primary manager's mobile device is correct, but the primary manager's password transmitted to the combination lock is incorrect (such as 235676), the lock management program of the primary manager's mobile device still cannot enter the main setting mode. Thus, it can be appreciated that the lock management program of the primary manager's mobile device enters the main setting mode only when the fingerprint feature inputted via the primary manager's mobile device is correct and the primary manager's password transmitted to the combination lock is correct.

After entering the main setting mode, when the holder of the primary manager's mobile device selects the primary user setting procedure (step S76), the lock management program request input of a primary user's information including a primary user's serial number, and a primary user's password corresponding to the primary user's information will be set (step S78). Next, the primary user's password can be inputted again for confirmation purposes (step S80). If the primary user's password inputted for the second time is not the same as the primary user's password inputted for the first time, the procedure of requesting second input of the primary user's password repeats until the primary user's password inputted for the second time is the same as the primary user's password inputted for the first time.

It is worth mentioning that the primary user's information may also include the name, nickname, etc. of the primary user. Therefore, it can be appreciated that the primary user's information may also include both the serial number assigned to the primary user and the name of the primary user, and the primary manager's password is tied with the primary user's information.

After inputting the primary user's password for the first time, requesting input of the primary user's password for the second time assists the primary manager in confirming whether the primary user's password is the desired password.

After confirmation of the primary user's password, a password list is established based on the primary user's information and the primary user's password (step S82). As an example, the password list may be a paper listing the primary user's information (such as the serial number assigned to the primary user and the name of the primary user) and the primary user's password associated with the primary user's information.

Next, the authorization information of the primary user's password is transmitted to the connected combination lock to update the lock information of the combination lock (step S84), such that the primary user's password can be used to unlock the combination lock.

With reference to FIG. 5, after the primary user's password of the lock information is updated, when an unlocking password is inputted via the keypad (step S24) and selects the unlocking procedure (step S151), the unlocking password is compared with the primary manager's password and the primary user's password to identify whether the unlocking password is correct (step S153). When the unlocking password matches none of the primary manager's password and the primary user's password, the combination lock remains locked (step S155). When the unlocking password matches one of the primary manager's password and the primary user's password, the combination lock is unlocked (step S157).

For example, in a case that the primary manager's password is 225676 and the primary user's password is 159357, when a person inputs 159357 via the keypad of the combination lock and presses the Enter key, the combination lock executes the unlocking procedure. After confirming that the password inputted via the keypad matches the primary user's password registered in the lock information, the combination lock is directly unlocked. In a case that the password inputted via the keypad is 159358 (which is not the correct password) and then presses the Enter key, the combination lock executes the unlocking procedure and determines that the inputted password matches none of the primary manager's password and the primary user's password. Thus, the combination lock remains locked.

The primary manager's mobile device can authorize at least one user for one-time use through the lock management program. With reference to FIG. 2A, when the primary manager's mobile device with the management authority executes the lock management program while the primary manager's mobile device is within the communication range of the combination lock (step S22), the primary manager's mobile device requests input of the identity information (step S52). At step S54, the identity information is identified. When the identity information is determined to be incorrect, the lock management program does not enter the main setting mode (step S56). On the other hand, when the identity information is determined to be correct, the lock management program enters the main setting mode (step S58).

After entering the main setting mode, the holder of the primary manager's mobile device may select the one-time user setting procedure (step S83), the lock management program of the primary manager's mobile device requests input of a one-time user's information including a serial number assigned to the one-time user that is permitted to use the one-time user's password for only one time.

It is worth mentioning that the information of the one-time user may also include the name, nickname, etc. of the one-time user. The information of the one-time user may also include both the serial number assigned to the one-time user and the name of the one-time user.

After inputting the information of the one-time user, a one-time user's password associated with the one-time user's information is set (step S85). Next, the one-time user's password is inputted again for confirmation purposes (step S87). When the one-time user's password inputted for the second time is not the same as the one-time user's password inputted for the first time, the procedure goes back to step S85 until the one-time user's password inputted for the second time is the same as the one-time user's password inputted for the first time.

After input of the one-time user's password for the first time, requesting input of the one-time user's password for the second time assists the primary manager in confirming whether the one-time user's password is the desired password.

When the inputted one-time user's password is confirmed, the one-time user's information and the associated one-time user's password are recorded in the password list (step S82). As an example, the password list may be a paper listing the one-time user's information (such as the serial number assigned to the one-time user and the name of the one-time user) and the one-time user's password associated with the one-time user's information. Furthermore, the one-time user's information is tied with the one-time user's password.

After confirming the one-time user's password, the authorization information of the one-time user's password is transmitted to the connected combination lock to update the lock information of the combination lock (step S84), such that the one-time user's password can be used to unlock the combination lock for one time.

With reference to FIG. 5, after the one-time user's password of the lock information is updated, when an unlocking password is inputted via the keypad (step S24) and selects the unlocking procedure (step S151), the unlocking password is compared with the primary manager's password, the primary user's password, and the one-time user's password to identify whether the unlocking password is correct (step S153). When the unlocking password matches none of the primary manager's password, the primary user's password, and the one-time user's password, the combination lock remains locked (step S155). When the unlocking password matches one of the primary manager's password, the primary user's password, and the one-time user's password, the combination lock is unlocked (step S157). It is worth mentioning that when the inputted password is the same as the one-time user's password, the one-time user's password will be deleted and the lock information will be updated after the combination lock is unlocked. Thus, the one-time user's password becomes invalid after one-time use. Namely, the combination lock remains locked when the one-time user's password is inputted for the second time.

For example, in a case that the primary manager's password is 225676, the primary user's password is 159357, and the one-time user's password is 951357, when a person inputs 951357 via the keypad of the combination lock and presses the Enter key, the combination lock executes the unlocking procedure. After confirming that the password inputted via the keypad matches the one-time user's password registered in the lock information, the combination lock is directly unlocked. Then, the combination lock deletes the one-time user's password and updates its lock information. In a case that the password inputted via the keypad is 651357 (which is not the correct password) and then presses the Enter key, the combination lock executes the unlocking procedure and determines that the inputted password matches none of the primary manager's password, the primary user's password, and the one-time user's password. Thus, the combination lock remains locked. Furthermore, since the one-time user's password is not used, the one-time user's password is still valid and remains in the lock information.

Figure 2B:
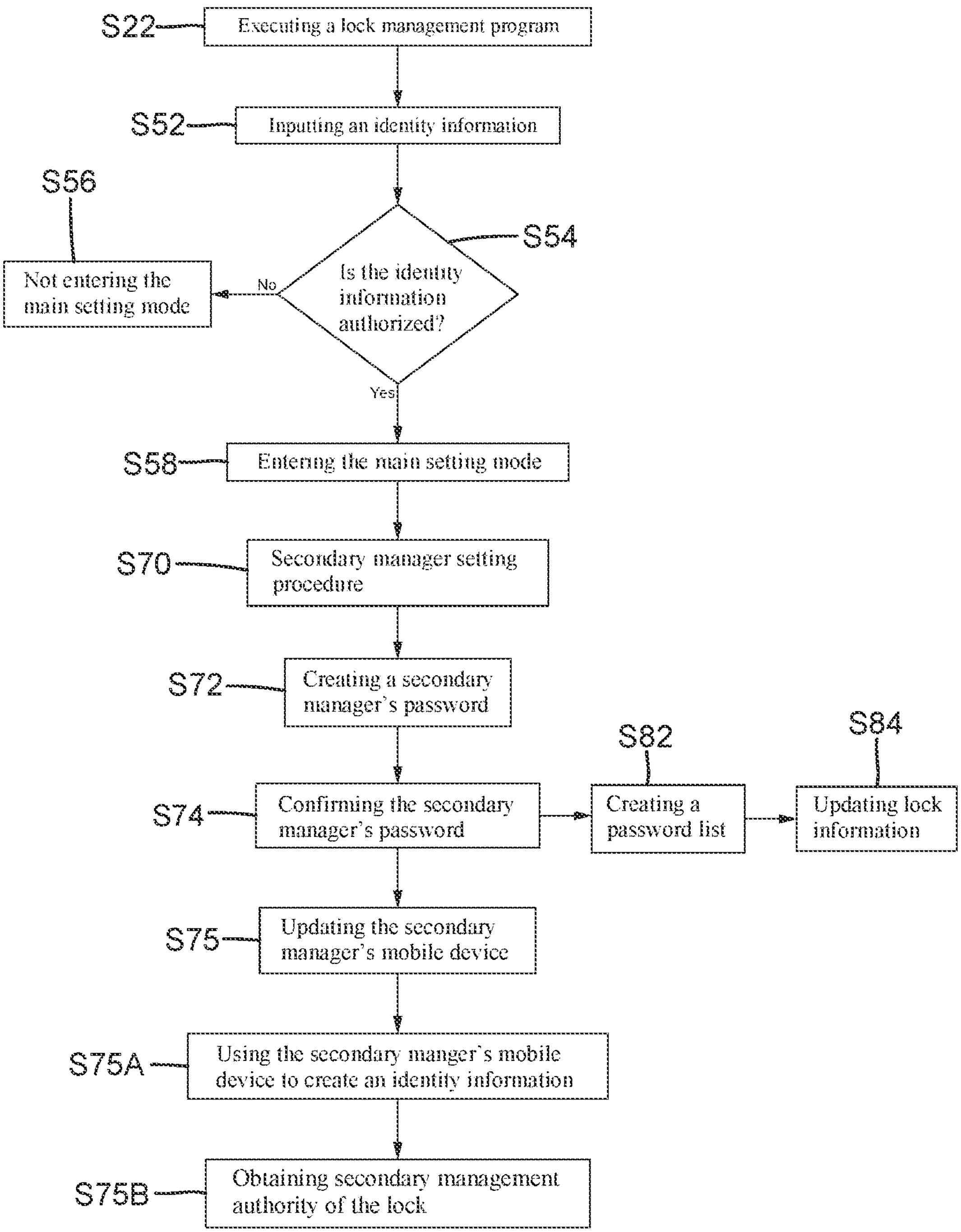
FIG. 2B is a flowchart illustrating obtaining a secondary management authority by a secondary manager's mobile device.

The primary manager's mobile device can be used to authorize at least one secondary manager via the lock management program. With reference to FIG. 2B, in a case that the primary manager's mobile device is within the communication range of the combination lock, has obtained the management authority of the combination lock, and executes the lock management program (step S22), the primary manager's mobile device requests input of the identity information (step S52) which is to be identified at step S54. When it is determined that the identity information is incorrect, the lock management program does not enter the main setting mode (step S56). On the other hand, when it is determined that the identity information is correct, the lock management program enters the main setting mode (step S58).

After entering the main setting mode, a secondary manager setting procedure can be selected (step S70). The lock management program requests input of a secondary manager's information including at least a secondary manager' serial number.

It is worth mentioning that the secondary manager's information may also include the name, nickname, etc. of the secondary manager. Therefore, it can be appreciated that the secondary manager's information may also include both the serial number assigned to the secondary manager and the name of the secondary manager, and the secondary manager's password is tied with the secondary manager's information.

At step S72, a secondary manager's password associated with the secondary manager's information is created. Next, the secondary manager's password is entered again for confirmation purposes (step S74). When the secondary manager's password inputted for the second time is not the same as the secondary manager's password inputted for the first time, the lock management program will request input of the secondary manager's password again. When the secondary manager's password inputted for the second time is the same as the secondary manager's password inputted for the first time, the secondary manager's information and the secondary manager's password are recorded on the password list (step S82). The password list may be a paper listing the secondary manager's password (such as the serial number assigned to the secondary manager and the name of the secondary manager) and the secondary manager's password associated with the secondary manager's information.

After inputting the secondary manager's password for the first time, requesting input of the secondary manager's password for the second time assists the primary manager in confirming whether the secondary manager's password is the desired password.

After confirming the secondary manager's password, the authorization information of the secondary manager's password is transmitted to the connected combination lock to update the lock information of the combination lock (step S84), such that the secondary manager's password can be used to unlock the combination lock. The secondary manager's password and the secondary manager's information are transmitted to a secondary manager's mobile device.

It is worth mentioning that aside from the wireless communication (such as Bluetooth and wireless network) mentioned above, the secondary manager's password and the secondary manager's information can be transmitted by the primary manager's mobile device to the secondary manager's mobile device via global system for mobile communications (GSM). Thus, even if the primary manager's mobile device is far away from the secondary manager's mobile device, the primary manager's mobile device can proceed with authorization of the secondary manager's mobile device.

After receiving the secondary manager's password and the secondary manager's information from the primary manager's mobile device, the lock management program installed on the secondary manager's mobile device requests input of an identity information including a biological feature of the secondary manager (step S75A). The biological feature can be, but not limited to, a fingerprint feature, a facial feature, an iris feature, or a finger vein feature. For example, the secondary manager's mobile device may include a fingerprint pick-up device. Thus, when the lock management program requests input of the biological feature, the holder of the secondary manager's mobile device can use the fingerprint pick-up device to pick up the fingerprint to serve as the identity information.

After establishment of the identity information, the identity information of the secondary manager, the secondary manager's information, and the secondary manager's password are tied together, and the secondary manager's mobile device obtains the secondary management authority of the combination lock (step S75B).

The secondary manager's password can be used to execute the unlocking procedure of the combination lock. With reference to FIG. 5, when an unlocking password is inputted via the keypad (step S24) and selects the unlocking procedure (step S151), the unlocking password is compared with the primary manager's password, the primary user's password, the one-time user's password, and the secondary manager's password to identify whether the unlocking password is correct (step S153). When the unlocking password matches none of the primary manager's password, the primary user's password, the one-time user's password, and the secondary manager's password, the combination lock remains locked (step S155). When the unlocking password matches one of the primary manager's password, the primary user's password, the one-time user's password, and the secondary manager's password, the combination lock is unlocked (step S157).

For example, in a case that the primary manager's password is 225676, the primary user's password is 159357, the one-time user's password is 951357, and the secondary manager's password is 753654, when a person inputs 753654 via the keypad of the combination lock and presses the Enter key, the combination lock executes the unlocking procedure. After confirming that the password inputted via the keypad matches the secondary manager's password registered in the lock information, the combination lock is directly unlocked. In a case that the password inputted via the keypad is 756654 (which is not the correct password) and then presses the Enter key, the combination lock executes the unlocking procedure and determines that the inputted password matches none of the primary manager's password, the primary user's password, the one-time user's password, and the secondary manager's password. Thus, the combination lock remains locked.

Figure 3:
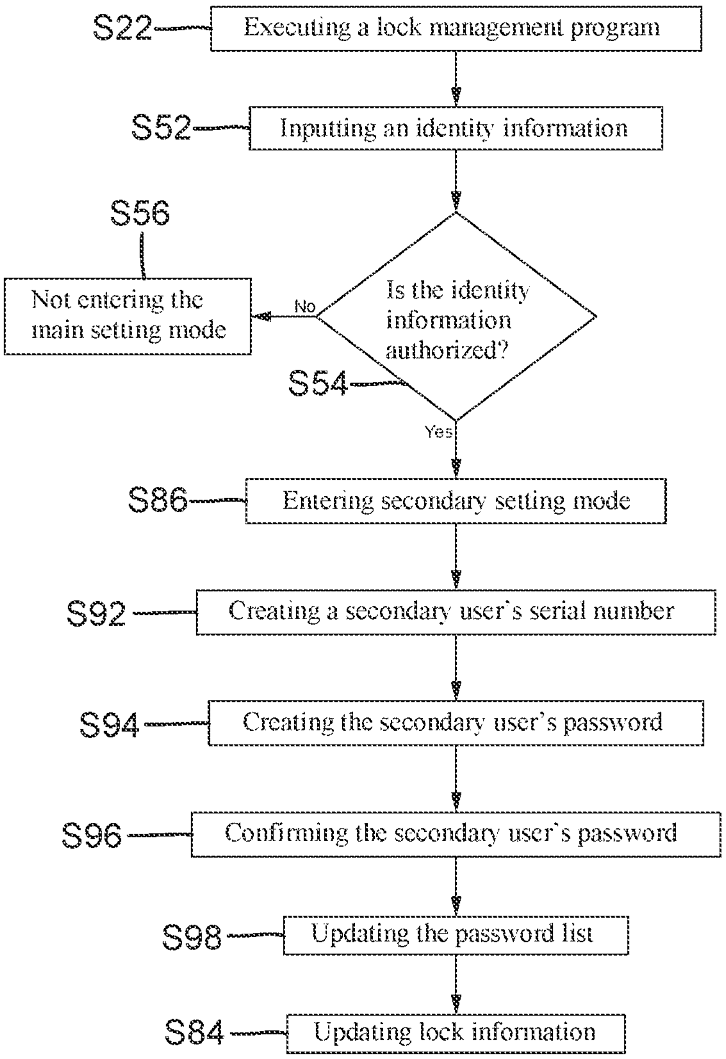
FIG. 3 is a flow chart illustrating setting of a secondary user by the secondary manager's mobile device which has obtained the secondary management authority.

After obtaining the secondary management authority, the secondary manager's mobile device may also authorize at least one secondary user to obtain the unlocking authority of the combination lock. With reference to FIG. 3, while the secondary manager's mobile device is within the communication range of the combination lock, the secondary manager's mobile device that has obtained the secondary management authority of the combination lock executes the lock management program (step S22), and the secondary manager's mobile device requests input of the identity information (step S52).

The identity information inputted via the interface of the lock management program is identified at step S54. When it is determined that the identity information is incorrect, the lock management program does not enter the main setting mode (step S56) nor a secondary setting mode (S86). On the other hand, when it is determined that the identity information is correct and matches the identity of the secondary manager, the lock management program enters the secondary setting mode (step S86).

In an embodiment, the secondary manager's mobile device can only use the identity information of the secondary manager to enter the secondary setting mode. For example, when the secondary manager's mobile device is used to input the identity information (such as a fingerprint) of the primary manager or a third person, the identity information will be determined by the secondary manager's mobile device as incorrect, such that the lock management program of the secondary manager's mobile device will not enter the secondary setting mode. Thus, the lock management program of the secondary manager's mobile device enters the secondary setting mode only when the identity information is correct and belongs to the secondary manager.

In an embodiment, the identity information of the secondary manager, the secondary manager's information, and the secondary manager's password are tied together. When it is determined that the identity information is correct, the secondary manager's mobile device transmits the secondary manager's password to the combination lock. After the combination lock determines that the secondary manager's password is correct, the combination lock informs the secondary manager's mobile device of the determination result, such that the secondary manager's mobile device confirms the identity information and enters the secondary setting mode.

For example, in a case that the identity information is a fingerprint feature of the secondary manager and the secondary manager's password is 753654, when a fingerprint feature inputted through the secondary manager's mobile device is incorrect, the lock management program of the secondary manager's mobile device will not enter the secondary setting mode. On the other hand, when the fingerprint feature inputted through the secondary manager's mobile device is correct, but the secondary manager's password (such as 235676) transmitted to the combination lock is incorrect, the lock management program of the secondary manager's mobile device still cannot enter the secondary setting mode. Thus, it can be appreciated that the lock management program of the secondary manager's mobile device can enter the secondary setting mode only when both the fingerprint feature inputted through the secondary manager's mobile device and the secondary manager's password transmitted from the secondary manager's mobile device to the combination lock are correct.

After entering the secondary setting mode, the lock management program of the secondary manager's mobile device requests input of a secondary user information including at least a secondary user's serial number (step S92). A secondary user's password is created at step S94. The secondary user's password is inputted again for confirmation purposes (step S96). When the secondary user's password inputted for the second time is not the same as the secondary user's password inputted for the first time, the procedure of requesting second input of the secondary user's password repeats until the secondary user's password inputted for the second time is the same as the secondary user's password inputted for the first time.

After inputting the secondary user's password for the first time, requesting input of the secondary user's password for the second time assists the secondary manager in confirming whether the secondary user's password is the desired password.

When the inputted secondary user's password is confirmed, the secondary user's information and the associated secondary user's password are recorded in the password list (step S98). As an example, the password list may be a paper listing the secondary user's information (such as the serial number assigned to the secondary user and the name of the secondary user) and the secondary user's password associated with the secondary user's information.

Next, the authorization information of the secondary user's password is transmitted to the connected combination lock to update the lock information of the combination lock (step S84), such that the secondary user's password can be used to unlock the combination lock.

With reference to FIG. 5, when an unlocking password is inputted via the keypad (step S24) and selects the unlocking procedure (step S151), the unlocking password is compared with the primary manager's password, the primary user's password, the one-time user's password, the secondary manager's password, and the secondary user's password to identify whether the unlocking password is correct (step S153). When the unlocking password matches none of the primary manager's password, the primary user's password, the one-time user's password, the secondary manager's password, and the secondary user's password, the combination lock remains locked (step S155). When the unlocking password matches one of the primary manager's password, the primary user's password, the one-time user's password, the secondary manager's password, and the secondary user's password, the combination lock is unlocked (step S157).

For example, in a case that the primary manager's password is 225676, the primary user's password is 159357, the one-time user's password is 951357, the secondary manager's password is 753654, and the secondary user's password is 852456, when a person inputs 852456 via the keypad of the combination lock and presses the Enter key, the combination lock executes the unlocking procedure. After confirming that the password inputted via the keypad matches the secondary user's password registered in the lock information, the combination lock is directly unlocked. In a case that the password inputted via the keypad is 852996 (which is not the correct password) and then presses the Enter key, the combination lock executes the unlocking procedure and determines that the inputted password matches none of the primary manager's password, the primary user's password, the one-time user's password, the secondary manager's password, and the secondary user's password. Thus, the combination lock remains locked.

Figure 4:
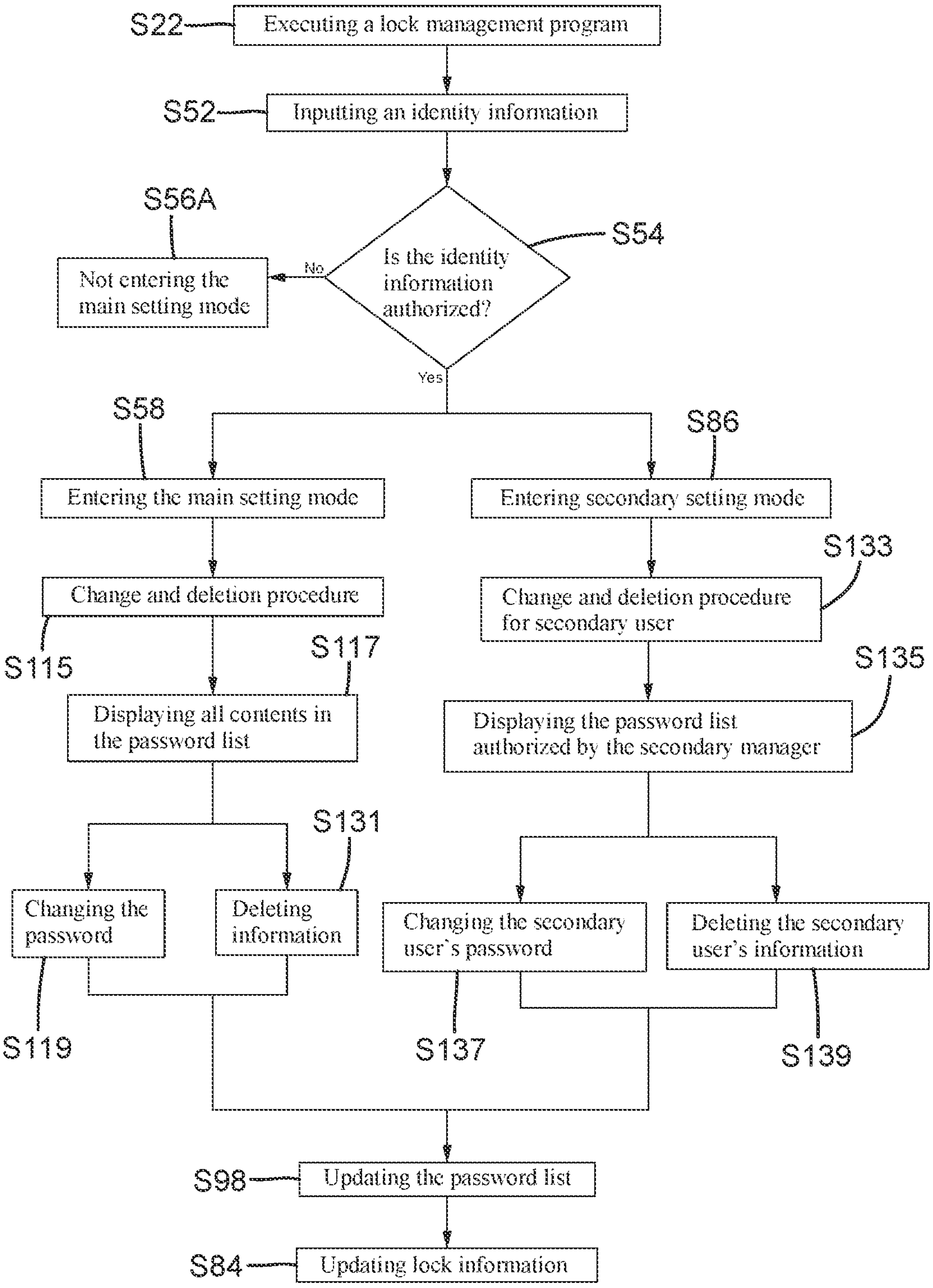
FIG. 4 is a flowchart illustrating procedures of deletion and change by the primary manager's mobile device and the secondary manager's mobile device.

The authority of the primary user, the secondary manager, the one-time user and the secondary user can be deleted or changed through the lock management program. With reference to FIG. 4, in a case that a mobile device (such as the primary manager's mobile device or the secondary manager's mobile device) is within the communication range of the combination lock and executes the lock management program (step S22), the lock management program requests input of the identity information (step S52) which is to be identified at step S54. When it is determined that the identity information is incorrect, the lock management program does not enter the main setting mode nor the secondary setting mode (step S56A). On the other hand, when it is determined that the identity information is valid and has authority, the lock management program identifies whether the identification information belongs to the primary manager or any secondary manager. In a case that the lock management program identifies the valid identity information belongs to the primary manager, the lock management program enters the main setting mode (step S58) and is connected with the combination lock. In another case that the lock management program identifies the valid identity information belongs to a secondary manager, the lock management program enters the secondary setting mode (step S86) and is connected with the combination lock.

When the lock management program enters the main setting mode, a change and deletion procedure of the main setting mode can be selected (step S115). The lock management program displays all contents of the password list associated with the connected combination lock (step S117).

In an embodiment, the password list displayed under the main setting mode includes each primary user, each one-time user, each secondary manager, and each secondary user authorized by each secondary manager. Namely, the password list displayed under the main setting mode includes all informations of the persons with the unlocking authority of the combination lock.

For example, the primary manager authorizes a first secondary manager A, a second secondary manager B, a first primary user C, and a one-time user D. The first secondary manager A authorizes three secondary users E, F, and G. The second secondary manager B authorizes two secondary users H and I. In a case that the lock management program identifies that the identity information belongs to the primary manager, the password list displayed by the lock management program under the main setting mode includes all data of A, B, C, D, E, F, G, H, and I.

In this case, the to-be-changed password in the primary user's information, the one-time user's information, the secondary manager's information, or the secondary user's information can be selected, and a new password for the primary user, the one-time user, the secondary manager, or the secondary user can be entered.

For example, in a case that the primary user's password of the primary user C is to be changed, the change and deletion procedure is executed, and the primary user C on the password list is selected. Then, the primary user's password of the primary user C is changed (step S119).

Furthermore, when the change and deletion procedure is executed, the information of the primary user, the one-time user, the secondary manager, or the secondary user can be deleted. Specifically, the selected primary user's information and the associated primary user's password, the selected one-time user's information and the associated one-time user's password, the selected secondary manager's information and the associated secondary manager's password, or the selected secondary user's information and the associated secondary user's password can be deleted (step S131).

For example, in a case that the primary manager intends to delete the authority of the primary user C, when the change and deletion procedure is executed, the primary user C on the password list is selected, and both the password of the primary user C and the primary user C's information are deleted.

After the change of the primary user's password, the one-time user's password, the secondary manager's password, or the secondary user's password, or after deletion of the primary user's information and the associated primary user's password, the one-time user's information and the associated one-time user's password, the secondary manager's information and the associated secondary manager's password, or the secondary user's information and the associated secondary user's password, the lock management program updates the password list (step S98) and updates the lock information of the combination lock connected thereto (step S84). Thus, the changed primary user's password, the changed one-time user's password, the changed secondary manager's password, or the changed secondary user's password can be used to unlock the combination lock. Furthermore, after deletion, the primary user's information and the associated primary user's password, the one-time user's information and the associated one-time user's password, the secondary manager's information and the associated secondary manager's password, or the secondary user's information and the associated secondary user's password become invalid and, thus, cannot be used to unlock the combination lock.

Furthermore, when the primary manager selects deletion in the change and deletion procedure, the primary user's mobile device will transmit the information associated with the deletion to the associated secondary manager's mobile device, such that the lock management program of the secondary manager's mobile device can update the secondary manager's password information.

In a case that the lock management program identifies that the identity information belongs to the secondary manager, the lock management program enters the secondary setting mode. When the secondary manager selects a change and deletion procedure of the secondary setting mode (step S133), the password list displayed by the lock management program only shows each secondary user's information which is on the password list associated with the connected combination lock and which is authorized by the secondary manager (whose identity has been identified).

Specifically, the password list displayed in the secondary setting mode will include each secondary user authorized by the secondary manager. Namely, the password list displayed in the secondary setting mode will only show the informations of the combination lock whose unlocking authority is authorized by the respective secondary manager.

For example, a first secondary manager A authorizes three secondary users E, F, and G, and a second secondary manager B authorizes two secondary users H and I. When the lock management program of the secondary manager's mobile device of the first secondary manager A executes the change and deletion procedure, the password list of the lock management program of the secondary manager's mobile device of the first secondary manager A will only show the informations of the three secondary users E, F, and G. Thus, the first secondary manager A can only change the passwords of the three secondary users E, F, and G or delete the informations and passwords of the three secondary users E, F, and G.

Thus, it can be appreciated that when the second secondary manager B executes the change and deletion procedure, the password list of the secondary manager's mobile device of the second secondary manager B will only show the informations of the two secondary users H and I.

When the secondary manager executes the change and deletion procedure, the secondary manager selects the secondary user (whose password is to be changed) from the password list listing all secondary users, and a new password can be inputted (step S137). Alternatively, the secondary manager may select the secondary user (whose information and password are to be deleted) from the password list listing all secondary users, and the information and password of the selected secondary user can be deleted (step S139).

After changing the password of the secondary user or deletion of the information and password of the secondary user, the lock management program updates the password list of the secondary manager's mobile device (step S98) and updates the lock information of the combination lock connected to the secondary manager's mobile device (step S84). After updating, the new secondary user's password can be used to unlock the combination lock. Alternatively, after deletion, the deleted secondary user's information and the deleted secondary user's password become invalid and, thus, cannot be used to unlock the combination lock.

As can be appreciated from the described technical features of the present invention, the primary manager's mobile device of the primary manager can easily proceed with operations of obtaining the management authority of the combination lock and changing the primary manager's password.

Furthermore, the authorization, deletion, or change of the primary user's information, the primary user's password, the secondary manager's information, the secondary manager's password, the one-time user's information, the one-time user's password, the secondary user's information, and the secondary user's password by the primary manager through the primary manager's mobile device (which has obtained the management authority of the combination lock) can be relatively convenient.

The password list can show the information and associated password of each authorized primary user, each authorized one-time user, each authorized secondary manager, and each authorized secondary user to assist the primary manager and the secondary manager in effectively managing the authorization of the combination lock.

The authorization, deletion, or change of the secondary user's information and the secondary user's password by the secondary manager through the secondary manager's mobile device (which has obtained the management authority of the combination lock) can be relatively convenient.

When the lock management program is executed, the identity information must be inputted to permit the lock management program to identity whether the holder of the primary manager's mobile device or the secondary manager's mobile device has the management authority. The lock management program will automatically enter the main setting mode or the secondary setting mode based on the identity of the holder which is identified as the primary manager or the secondary manager. Thus, the lock management program provides both safety and convenience.

Now that the basic teachings of the present invention have been explained, many extensions and variations will be obvious to one having ordinary skill in the art. For example, after the secondary manager executes the change and deletion procedure for the associated secondary user, the secondary manager's mobile device can be connected with the primary manager's mobile device via GSM, such that the primary manager's mobile device can also update its password list. Alternatively, after the secondary manager executes the change and deletion procedure for the associated secondary user, the primary manager's mobile device can be connected with the combination lock to update the password list of the primary manager's mobile device.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A control method of a combination lock, with the control method comprising:

executing a lock management program installed in a primary manager's mobile device;

using a keypad of a combination lock to input a password and selecting an authorization procedure to be executed by the combination lock, wherein when the inputted password does not match an original password stored in the combination lock, the combination lock does not enter the authorization procedure, and wherein when the inputted password matches the original password, the combination lock enters the authorization procedure and is connected with the primary manager's mobile device;

using the primary manager's mobile device to input a real-time password through the an interface of the lock management program while the primary manager's mobile device is in connection with the combination lock and the combination lock executes the authorization procedure, wherein when the real-time password does not match the original password, the lock management program request input of a new real-time password, and wherein when the real-time password matches the original password, the lock management program requests input of an identity information of a biological feature of the primary manager; and identifying the identity information and operating the lock management program to enter a main setting mode providing option of resetting the original password, wherein when resetting the original password is not selected, the original password is still used as the primary manager's password, and the primary manager's mobile device obtains primary management authority of the combination lock, and wherein when resetting the original password is selected, a new password is inputted and becomes the primary manager's password, wherein the identity information of the primary manager is tied with the primary manager's password, and the primary manager's mobile device obtains the primary management authority of the combination lock.

2. The control method of the combination lock as claimed in claim 1, wherein the biological feature is one of a fingerprint feature, a facial feature, an iris feature, and a finger vein feature, and wherein the original password is a password preset by a manufacturer of the combination lock.

3. The control method of the combination lock as claimed in claim 1, further comprising using the keypad of the combination lock to input an unlocking password and selecting an unlocking procedure, wherein when the unlocking password does not match the primary manager's password, the combination lock remains locked, and wherein the combination lock is unlocked when the unlocking password matches the primary manager's password.

4. The control method of the combination lock as claimed in claim 1, wherein with the primary manager's mobile device which has obtained the management authority of the combination lock is within a communication range of the combination lock and the primary manager's mobile device executes the lock management program, the primary manager's mobile device requests input of an identity information, wherein when the identity information is incorrect, the lock management program does not enter a main setting mode, and wherein when the identity information is correct, the management program enters the main setting mode, wherein when a primary user setting procedure of the main setting mode is selected, the lock management program requests input of a primary user's information including a primary user's serial number, and a primary user's password associated with the primary user's information is created and listed on a password list, and wherein the primary user's password is transmitted to the combination lock to update the combination lock information, permitting unlocking of the combination lock by the primary user's password.

5. The control method of the combination lock as claimed in claim 4, wherein with the lock management program entering the main setting mode, when a change and deletion procedure of the main setting mode is selected, the lock management program displays all contents on the password list, with the control method further comprising:

selecting a primary user whose password is to be changed from the password list, changing the password of the selected primary user by inputting a new primary user's password associated with the primary user, and updating the password list and the combination lock information to include the change of the primary user's password, or selecting a primary user whose information is to be deleted from the password list, deleting the information and the password of the selected primary user, and updating the password list and the combination lock information to include the deletion of the primary user's password and the primary user's information.

6. The control method of the combination lock as claimed in claim 4, wherein with an unlocking password inputted via the keypad of the combination lock and an unlocking procedure is selected, when the unlocking password matches none of the primary manager's password and the primary user's password, the combination lock remains locked, and wherein when the unlocking password matches one of the primary manager's password and the primary user's password, the combination lock is unlocked.

7. The control method of the combination lock as claimed in claim 4, wherein when the identity information is correct, the primary manager's mobile device transmits the primary manager's password to the combination lock connected with the primary manager's mobile device, wherein the combination lock informs the primary manager's mobile device after the combination lock confirms the primary manager's password is correct, such that the primary manager's mobile device confirms the identity information and enters the main setting mode.

8. The control method of the combination lock as claimed in claim 1, wherein with the primary manager's mobile device which has obtained the management authority of the combination lock is within a communication range of the combination lock and the primary manager's mobile device executes the lock management program, the primary manager's mobile device requests input of an identity information, wherein when the identity information is incorrect, the lock management program does not enter a main setting mode, and wherein when the identity information is correct, the management program enters the main setting mode, wherein when a secondary manager setting procedure of the main setting mode is selected, the lock management program requests input of a secondary manager's information including a secondary manager's serial number, and a secondary manager's password associated with the secondary manager's information is created and listed on a password list, wherein the secondary manager's password is transmitted to the combination lock to update the combination lock information, permitting unlocking of the combination lock by the secondary manager's password, wherein the secondary manager's password and the secondary manager's information are transmitted to a secondary manager's mobile device, wherein a lock management program of the secondary manager's mobile device requests input of an identity information including a biological feature of the secondary manager, wherein after input of the identity information of the secondary manager, the identity information of the secondary manager, the secondary manager's information, and the secondary manager's password are tied together, and the secondary manager's mobile device obtains a secondary management authority of the combination lock.

9. The control method of the combination lock as claimed in claim 8, wherein when the identity information is correct, the secondary manager's mobile device transmits the secondary manager's password to the combination lock connected with the secondary manager's mobile device, wherein the combination lock informs the secondary manager's mobile device after the combination lock confirms the secondary manager's password is correct, such that the secondary manager's mobile device confirms the identity information and enters a secondary setting mode.

10. The control method of the combination lock as claimed in claim 8, wherein with the secondary manager's mobile device which has obtained the management authority of the combination lock is within a communication range of the combination lock and the secondary manager's mobile device executes the lock management program, the secondary manager's mobile device requests input of an identity information, wherein when the identity information is incorrect, the lock management program does not enter a secondary setting mode, and wherein when the identity information is correct, the management program enters the secondary setting mode, wherein when the secondary user setting procedure of the main setting mode is entered, the lock management program requests input of a secondary user's information including a secondary user's serial number, and a secondary user's password associated with the secondary user's information is created, and the password list is updated, wherein the secondary user's password is transmitted to the combination lock to update the combination lock information, permitting unlocking of the combination lock by the secondary user's password.

11. The control method of the combination lock as claimed in claim 8, wherein with the lock management program entering the secondary setting mode, when a change and deletion procedure of the secondary setting mode is selected, the lock management program displays contents related to each secondary user authorized by the secondary manager on the password list, with the control method further comprising:

selecting a secondary user whose password is to be changed from the password list, changing the password of the selected secondary user by inputting a new secondary user's password associated with the secondary user, and updating the password list and the combination lock information to include the change of the secondary user's password, or selecting a secondary user whose information is to be deleted from the password list, deleting the information and the password of the selected secondary user (S139), and updating the password list and the combination lock information to include the deletion of the secondary user's password and the secondary user's information.

12. The control method of the combination lock as claimed in claim 8, wherein with an unlocking password inputted via the keypad of the combination lock and an unlocking procedure is selected, when the unlocking password matches none of the primary manager's password and the secondary manager's password, the combination lock remains locked, and wherein when the unlocking password matches one of the primary manager's password and the secondary manager's password, the combination lock is unlocked.

13. The control method of the combination lock as claimed in claim 10, wherein with an unlocking password inputted via the keypad of the combination lock and an unlocking procedure is selected, when the unlocking password matches none of the primary manager's password, the secondary manager's password, and the secondary user's password, the combination lock remains locked, and wherein when the unlocking password matches one of the primary manager's password, the secondary manager's password, and the secondary user's password, the combination lock is unlocked.

14. The control method of the combination lock as claimed in claim 1, wherein with the primary manager's mobile device which has obtained the management authority of the combination lock is within a communication range of the combination lock and the primary manager's mobile device executes the lock management program, the primary manager's mobile device requests input of an identity information, wherein when the identity information is incorrect, the lock management program does not enter a main setting mode, and wherein when the identity information is correct, the management program enters the main setting mode, wherein when a primary manager's password change procedure of the main setting mode is selected, the lock management program requests input of a current primary manager's password, wherein when the inputted password does not match the current primary manager's password, the current primary manager's password is not changed, wherein when the inputted password matches the current primary manager's password, a new primary manager's password is inputted to change the primary manager's password, and the new primary manager's password is transmitted to the combination lock to update the combination lock information, permitting unlocking of the combination lock by the new primary manager's password.

15. The control method of the combination lock as claimed in claim 1, wherein with the primary manager's mobile device which has obtained the management authority of the combination lock is within a communication range of the combination lock and the primary manager's mobile device executes the lock management program, the primary manager's mobile device requests input of an identity information, wherein when the identity information is incorrect, the lock management program does not enter a main setting mode, and wherein when the identity information is correct, the management program enters the main setting mode, wherein when a one-time user setting procedure of the main setting mode is selected, the lock management program requests input of a one-time user's information including a one-time user's serial number, and a one-time user's password associated with the one-time user's information is created and listed on a password list, and wherein the one-time user's password is transmitted to the combination lock to update the combination lock information, permitting one-time unlocking operation of the combination lock by the one-time user's password.

16. The control method of the combination lock as claimed in claim 15, wherein with an unlocking password inputted via the keypad of the combination lock and an unlocking procedure is selected, when the unlocking password matches none of the primary manager's password and the one-time user's password, the combination lock remains locked, wherein when the unlocking password matches one of the primary manager's password and the one-time user's password, the combination lock is unlocked, and wherein the combination lock updates the combination lock information after the combination lock has been unlocked, such that the one-time password is incapable of unlocking the combination lock.

17. The control method of the combination lock as claimed in claim 1, wherein after the primary manager's mobile device has set the primary manager's password, the primary manager's mobile device acquires a hardware identification information of the combination lock, wherein every time the primary manager's mobile device is connected with the combination lock, the primary manager's mobile device uses the hardware identification information to identify whether the primary manager's mobile device has the management authority of the combination lock connected thereto.

* * * * *